United States Patent [19]
Ceccarani

[11] Patent Number: 5,860,353
[45] Date of Patent: Jan. 19, 1999

[54] APPARATUS AND METHOD FOR ACCELERATING AGING OF ALCOHOLIC LIQUIDS SUCH AS WINES, BRANDIES, SPIRITS AND THE LIKE

[75] Inventor: Franco Ceccarani, Milan, Italy

[73] Assignee: Guido Caprotti, London, United Kingdom

[21] Appl. No.: 924,311

[22] Filed: Sep. 5, 1997

[30] Foreign Application Priority Data

Sep. 9, 1996 [IT] Italy .................................. MI96A1853

[51] Int. Cl.⁶ ....................................................... C12H 1/00
[52] U.S. Cl. ............................................. 99/277.1; 99/451
[58] Field of Search .................................... 99/277.1, 277, 99/275, 451, 483; 426/234, 237, 238

[56] References Cited

U.S. PATENT DOCUMENTS 4,612,199  9/1986  Miyahara ............................. 426/521 X
5,113,751  5/1992  Holcomb et al. .......................... 99/286
5,173,318  12/1992  Leu et al. ............................ 99/277.1 X
5,556,654  9/1996  Fregeau .................................. 99/275 X Primary Examiner—Reginald L. Alexander
Attorney, Agent, or Firm—Browdy and Neimark

[57] ABSTRACT

Alcoholic liquids ready for aging and contained in vessels such as bottles, casks and the like are submitted to low-frequency polarized pulsating magnetic fields. Fields are produced by air-core wound solenoids made of an electric conductive wire and disposed close to the vessels. Solenoids are connected individually or by groups to respective generators adapted to supply a low-frequency pulsating current of 50 Hz for example. Solenoids can be incorporated in panel-shaped containers or fastened to support structures to be associated with a plurality of vessels holding the liquids for aging.

12 Claims, 2 Drawing Sheets

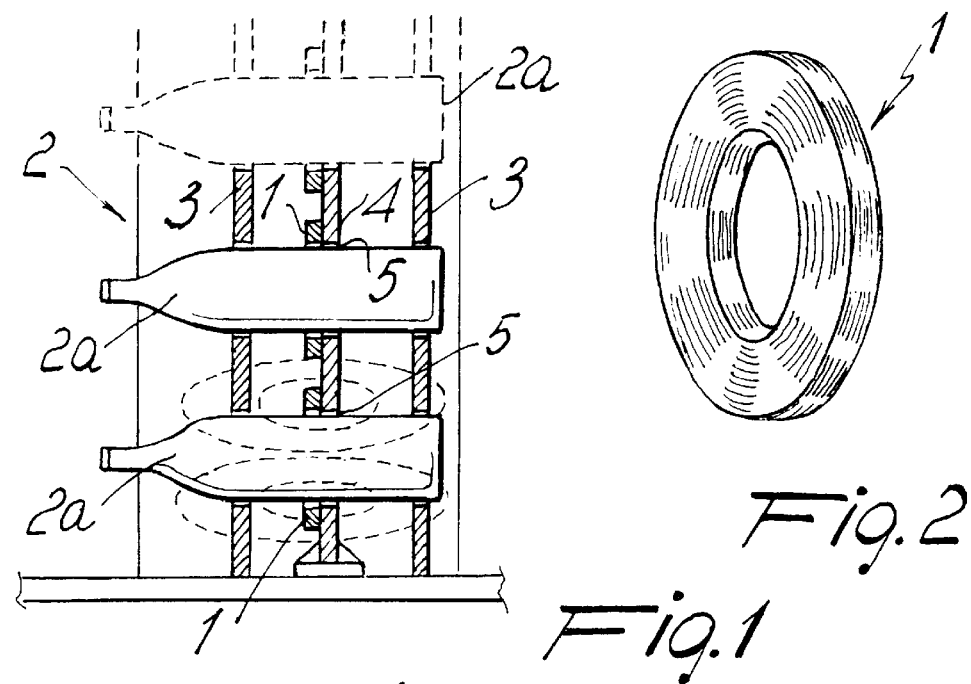
Fig. 1
Fig. 2
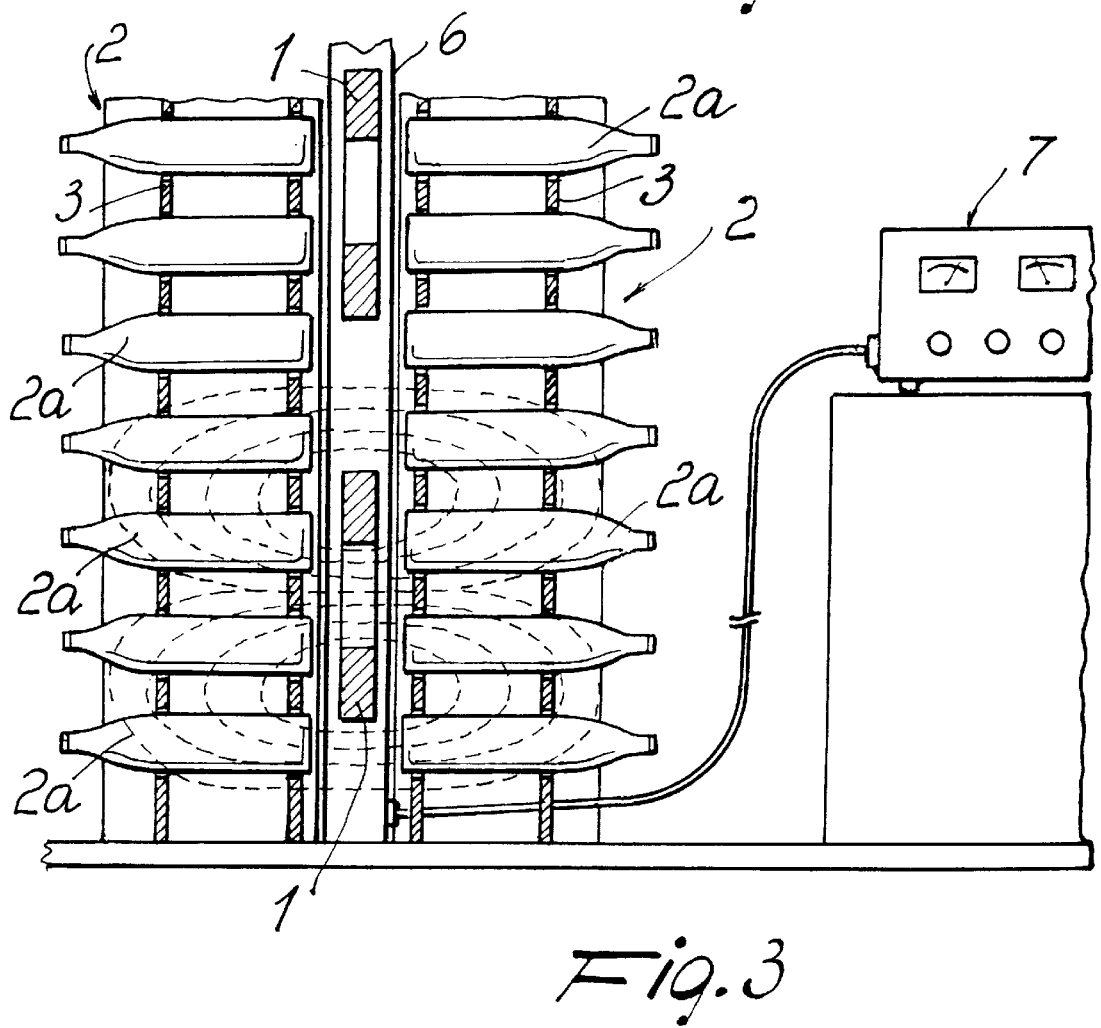
Fig. 3

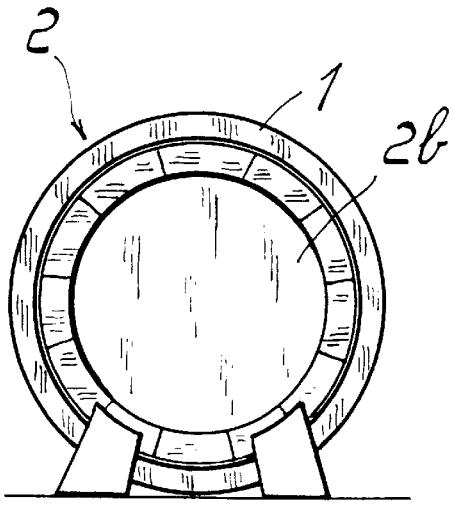 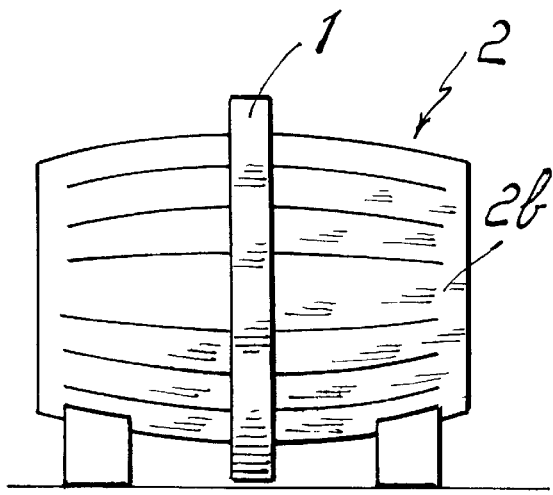
Fig.4  Fig.5
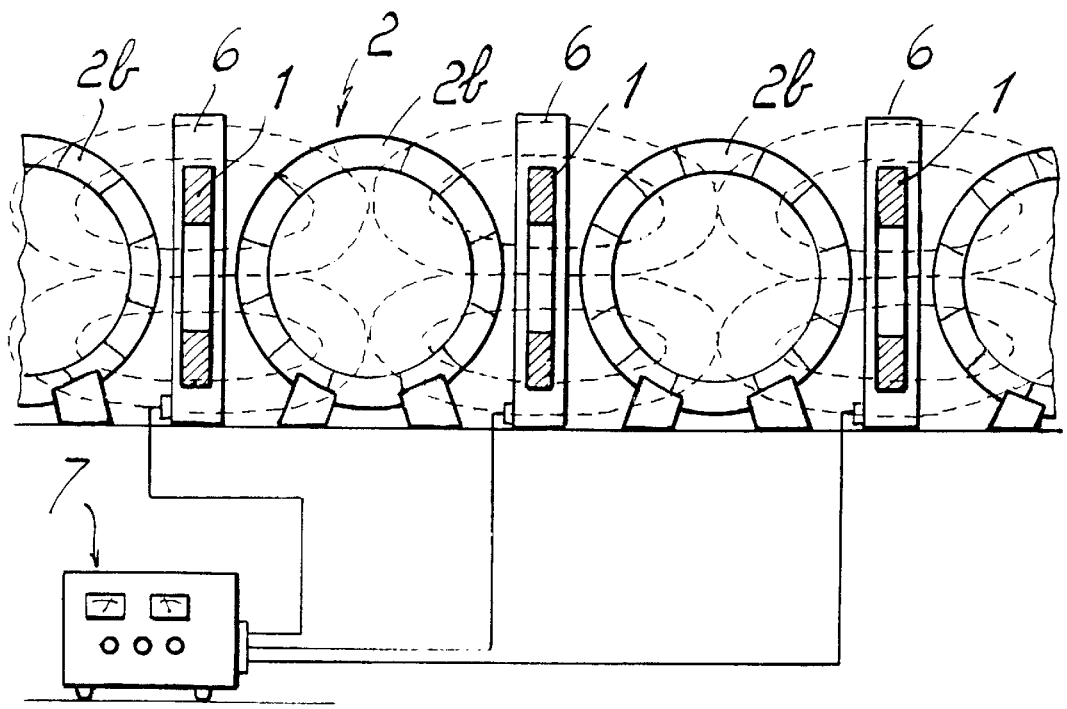
Fig.6

APPARATUS AND METHOD FOR ACCELERATING AGING OF ALCOHOLIC LIQUIDS SUCH AS WINES, BRANDIES, SPIRITS AND THE LIKE

FIELD OF THE INVENTION

The present invention relates to an apparatus and a method for accelerating aging of alcoholic liquids, such as wines, brandies, spirits and the like.

It is known that in producing alcoholic liquids or drinks obtained by fermentation of grape-musts, different types of fruit, cereals and other products, an aging step is often provided, in which the fermented product is allowed to stand in appropriate vessels, in particular casks or bottles, where it undergoes a slow maturing process intended for improving and refining its organoleptic properties.

Usually some years are required for the above process. Thus, for example, cognac, whisky, some types of grappas and brandy are allowed to age inside wooden casks over a period of three, four or more years, before they may reach the specific aroma, colour and taste features distinguishing them and making them ready for consumption. Aging takes place in conveniently equipped and checked storage cellars.

Some types of wine too are submitted to aging of a duration of some years. Usually the process, started in casks, is completed by keeping the wine in bottles, generally disposed horizontally in cellars or similar storage rooms.

Not only very long periods of time are required for the aging process, but there is also a need for appropriate rooms that must be maintained under predetermined temperature, humidity, ventilation and other conditions. In many cases regular and constant care by qualified staff is required.

All the above involves an important capital locking up and heavy expenses that inevitably adversely affect the final cost of the product.

DESCRIPTION OF THE PRIOR ART

Attempts have been already made in order to reduce these long periods of time for natural maturation, by resorting to artificial aging systems. These systems however have been at best applied only to a limited extent, both because usually products provided with a seal of quality or quality trademark must be submitted to strictly prescribed treatment or working processes and because these systems generally involve important modifications in the structure of traditional aging plants.

Already known are devices for accelerating aging of wines and brandies in which the products are held in particular bottles and maintained under special bell-shaped caps adapted to produced, due to their own conformation, waves onto the products, thereby accelerating maturation thereof.

According to other devices, provision is made for employment of particular vessels for the liquids to be submitted to aging, which are internally provided with shaped elements so as to increase surfaces in contact with the liquids, thereby promoting activation of the aging process by this expedient. For all these devices however, appropriate aging vessels or additional structures of special conformation for the vessels themselves are required, and this makes it necessary to carry out important changes in traditional aging plants.

In other known systems the alcoholic liquids are submitted, in their vessels, to high-frequency, in particular ultrasonic-frequency, mechanical vibrations. These systems can be hardly applied to big vessels, such as big casks, because they require an important construction effort and use of a great amount of power, so that the bigger the aging plants are, the higher the costs.

Another problem encountered with known devices for artificial aging concerns the possibility of always obtaining the same maturing conditions so that these conditions may be also repeated in time, thereby achieving constant results for all products submitted to the same treatment, this aim being sometimes of difficult achievement.

SUMMARY OF THE INVENTION

Under this situation, the technical task underlying the present invention is to overcome the limitations of the known artificial-aging systems for alcoholic liquids, through elimination of the above mentioned drawbacks.

Within the scope of this technical task, it is an important object of the present invention to provided an apparatus and a method for accelerating aging of alcoholic liquids, such as wines, brandies, spirits and the like, enabling the liquids to be acted upon without being obliged to modify the traditional aging vessels and without important changes being required in the traditional aging plants or rooms.

Another object of the invention is to provided an apparatus and a method capable of accelerating the natural aging process without involving mechanical movements on the vessels and the liquids to be submitted to aging.

A further object of the invention is to provide an aging apparatus and method enabling important reductions in the traditional aging time to be achieved, while at the same time maintaining and in some cases even improving, the organoleptic features of the treated products.

A still further object of the invention is that of providing a method of the type in reference allowing the realization of an apparatus of reduced cost even when big aging plants or rooms are concerned, and of easy use and control.

Another object of the invention is to provide an aging method that does not involve the use of chemical substances or agents to promote the aging process.

Another object of the invention is to provide an apparatus and a method, use of which gives rise to substantially the same results, independently of the vessel (cask, bottle, tank, etc.) in which the liquid to be submitted to aging is held. The technical task mentioned and the aims specified are substantially achieved by an apparatus and a method having the features in which the liquids prepared for aging are contained in vessels, in particular casks and bottles, comprising at least one air-core wound solenoid made of an electric conductive wire disposed close to at least one of said vessels, and at least one electric source to be connected with said at least one solenoid for generating a low-frequency polarized pulsating magnetic source to be connected with said at least one solenoid for generating a low-frequency polarized pulsating magnetic field at said at least one solenoid.

BRIEF DESCRIPTION OF THE DRAWINGS

More details of the invention and the resulting advantages will be best understood from the following description relating to some preferred embodiments thereof, given by way of non-limiting example with reference to the accompanying drawings, in which:

FIG. 1 is a fragmentary side view of an apparatus in accordance with the invention;

FIG. 2 shows one of the solenoids of the apparatus of FIG. 1;

FIG. 3 shows another possible apparatus for aging of liquids held in bottles;

FIG. 4 is a fragmentary front view of an apparatus for aging of alcoholic liquids held in casks;

FIG. 5 shows the same apparatus as above in a side view;

FIG. 6 shows another possible embodiment of an aging apparatus for alcoholic liquids held in casks.

DESCRIPTION OF THE PREFERRED EMBODIMENTS

With reference to the drawings, in order to reduce the aging time to an important extent as regards alcoholic liquids such as wines, brandies (in particular cognac, whisky, local brandies), beers and the like prepared by fermentation and intended for aging within appropriate vessels such as casks, bottles, barrels and others, in accordance with the invention the liquids held in said vessels are provided to be submitted at least temporarily to the action of low-frequency polarized pulsating magnetic fields.

To the ends of the present invention, by the above specification fields variable in time in a pulsed or repeated manner are intended, which fields have an invariable, that is unalternate, polarity, i.e. such a polarity that magnetic fluxes always directed in the same direction are created, although with variable intensity in a pulsating manner. Frequency of these fields is in the order of 20–400 Hz, in particular 50 Hz or 100 Hz.

Actually, it has been surprisingly found that the action of this type of magnetic fields has a stimulating effect on phenomena promoting aging of the alcoholic liquids, such as oxidation for example, and reduces time of aging, in some cases even to a very important degree, without decay and deterioration of the quality of the treated products; on the contrary, the obtained products have the same taste, aroma and colour features as the corresponding products aged in a traditional natural manner and sometimes even better features. By way of example only, in the final part of the present description some examples and the most significant data of tests carried out in this connection are given, reference being particularly made to some wines.

The pulsating magnetic action on the alcoholic liquids is advantageously carried out by one or more solenoids 1 made of an electric conductive wire air-core wound, that is not wound over an iron or other magnetic or magnetizable material, and disposed close to vessels 2 holding the liquids to be submitted to aging.

Solenoids 1 have a hollow shape and an essentially square or rectangular transverse section (FIG. 2).

In particular, in the case of aging carried out in bottles, where said bottles 2a are laid down in a horizontal arrangement in accordance with the traditional technique, supported by a carrying structure 3, solenoids 1 can be disposed on a support structure 4 in the form of a panel, the axes of which are substantially perpendicular to the structure 4 plane and spaced apart from each other as much as the axes of bottles 2a (FIG. 1).

The support structure 4 can be suitably incorporated in structure 3 carrying bottles 2a. At each solenoid 1, the support structure 4 has respective through openings 5, coaxial with the corresponding solenoids 1, for bottles 2a.

Due to the provided arrangement, each solenoid 1 is held coaxially about a bottle 2a and the magnetic flux produced by solenoid 1 passes through the liquid contained in the respective bottle 2a.

Solenoids 1 however can also be disposed within one or more panel-shaped containers, arranged in the carrying structure 3 and provided with through openings for bottles 2a.

A particular embodiment and arrangement of a support structure consisting of at least one panel-shaped container 6, holding a plurality of solenoids 1, is shown in FIG. 3 where container 6 is substantially seated between two carrying structures 3 disposed symmetrically in side-by-side relationship, i.e. between two rows of superposed bottles 2a.

In this case through openings for bottles 2a are not required in the panel-shaped containers 6 and solenoids 1 can be made and disposed in such a manner that more than one bottle 2a is concerned by the magnetic field generated by each of them, the distribution of the magnetic fields being however uniform for the different bottles 2a.

Solenoids 1 of the support structure 4 or of each panel-shaped container 6 are electrically connected, individually or by groups, to respective electric sources, diagrammatically represented by electric generators like the one denoted by 7 in the drawings. Several structures 4 or containers 6 may also be connected to a single generator 7.

Generators 7 are adapted to produce low-frequency unidirectional pulsating currents, so as to create said low-frequency polarized pulsating magnetic fields at the solenoids. Frequency may be a normal frequency of 50 Hz from a single-phase alternating current supply mains, in which case generators 7 are provided with means for continuously eliminating either of the two half-waves of the alternating current, the positive one or the negative one.

In addition, generators 7 can be provided with adjustment means to regulate the intensity and/or frequency of the generated current. They may also have means for timed switching on and off of them, depending on the different requirements connected with the specific use.

Advantageously generators 7 can be arranged at a position far away from the respective solenoids 1, in an appropriate room from which the whole maturation or aging plant is controlled and by which in particular solenoids 1 either of individual containers 6, or of individual structures 4, or of container 6 or structure 4 groups, are operated.

Shown in FIGS. 4 and 5, by way of example, is application of the method in accordance with the invention to an alcoholic Liquid contained in an aging cask 2b. In this case a solenoid 1 is disposed preferably coaxially about cask 2b, so as to generate a magnetic flux passing through the liquid contained in cask 2b substantially in an axial direction.

Solenoid 1 is fastened to cask 2b by any means of known type and is electrically connected, optionally with other solenoids 1 associated with other casks 2b, to an electric source consisting of one of the already mentioned generators 7.

It is to note that solenoids 1 do not necessarily need to be disposed around casks 2b in a loop conformation, but they can also be disposed close to the side of them, in particular between adjacent casks 2b, as shown in FIG. 6.

A plurality of these solenoids 1 may be provided in panel-shaped containers 6 which may be placed on more than one side of casks 2b, so that each solenoid 1 can have reduced sizes relative to casks 2b which can be also very big. Solenoids 1 of each of the containers 6 or container 6 groups are electrically connected to a respective generator 7.

For carrying out the method in accordance with the invention, magnetic fields of average intensities in the order of 10–120 Gauss have proved to be particularly appropriate, these magnetic fields being measured by means of a gauss-meter and a Hall probe at the inner holes of solenoids 1.

Obviously different values are also possible, depending on the treated liquid and the volume and arrangement of the treating vessels.

Treatment duration may vary from few days to few weeks. By the apparatus and the method in accordance with the invention, intervention on the aging process can be carried out without modifying the vessels containing the alcoholic liquids to be submitted to aging and also without substantially altering the traditional position of these vessels in the aging rooms.

Advantageously, in the method of the invention structures and means to cause mechanical vibration of the aging vessel supports or the aging vessels themselves are not required. In addition, this method can be used for big-sized vessels without any problem.

The apparatus in accordance with the invention has a simple and versatile structure and can be applied to traditional already existing aging plants without involving high costs. In addition, once the most appropriate values and times for an optimal maturation of the products has been established, checking and use of the above apparatus is easy.

Furthermore, the method of the invention avoids any intervention with chemical substances on the liquid to be aged so that the genuine character of the product is preserved. By tests carried out it has been possible to ascertain that the method of the invention enables products to be obtained that have the same organoleptic qualities as those naturally aged, and sometimes even better qualities, but in a much lower period of time.

In other words, treatment with aid magnetic fields for few days or very few weeks has proved to have the same aging effect as a natural aging carried out over years.

Also treatments of wines that are not of particular value have enabled these wines to have aroma, colour and taste features similar to those of typically aged wines.

A great constancy in results ha been also ascertained, that is a considerable uniformity in the organoleptic features of products aged at different periods of time but using the same treatment modalities, so that the method is capable of ensuring constant and repeatable results.

The apparatus and method in accordance with the invention apply to several different type of aging vessels and not only to casks or bottles.

In fact can be also used for liquids contained in tanks for example, in particular of substantially parallelepiped shape, because in this case an arrangement of one or more panel-shaped containers 6 with he related solenoids at one or more sides of said tanks can be conceived.

Action of the low-frequency polarized pulsating magnetic field on the product to be submitted o aging can be alternated with periods of traditional natural aging, since treatment with a magnetic field can be periodically stopped for periods of time as one likes.

Obviously, it can be also possible to employ the method of the invention in addition to a traditional aging method.

The intensity and/or frequency of the polarized pulsating magnetic fields can be maintained substantially constant during aging or be varied in the course of aging, in a progressive manner for example.

Advantageously, the treatment times and intensity and/or frequency values of the polarized pulsating magnetic fields can be stored in a central processing unit, adapted to automatically control the different generators 7 in time, in order to gradually supply the most appropriate values during the preestablished times.

The invention as described is susceptible of many variations and modifications, in addition to those already illustrated. Thus, for example, containers 6 could be disposed parallelly to the bottle 2a axis between groups of stacked up bottles, or close to bottles 2a disposed in a single row.

Solenoids 1 could be disposed in an interchangeable manner in the containers 6 or on the support structure 4. Likewise, also interchangeable could be the containers 6 and/or support structures 4 of one and the same apparatus.

EXAMPLES

Wines from the North and Centre of Italy have been submitted to a treatment with a pulsating magnetic field in accordance with the invention.

Treatment has been carried out on wines the natural maturation of which was at the beginning.

For each type of wine, products from different wine industries have been submitted to treatment.

At the end of the treatment period, examination of aroma and taste by professional tasters has been carried out and they have confirmed that the thus threated wines had the organoleptic features typical of the corresponding wines submitted to natural aging.

Comparison was carried out with products from the same origin and lot.

Data of some tests is summarized in the following table:

| Type of wine | Intensity of the magnetic field (average value) (Gauss) | Treatment time (days) |
| --- | --- | --- |
| Barbera | 50 | 3 |
| Dolcetto | 50 | 3 |
| Barolo | 70 | 7 |
| Rosso di Montalcino | 70 | 9 |
| Brunello di Montalcino | 60 | 10 |

Rosso di Montalcino wine, after treatment, was similar to Brunello di Montalcino wine as to aroma, colour and taste. Other tests have been carried out with wines such as Nebbiolo and Barbaresco of Piemonte, Inferno and Sassella of Lombardia, Chianti of Toscana and some wines from Veneto and Friuli Venezia Giulia, using average magnetic-field intensities varying between 10 and 120 Gauss.

Tests have brought to achievement of the properties of the corresponding naturally aged wines, after only 1–10 days of treatment.

Also treated have been some types of whisky, gin, rum and beers, using treatment times varying between 10 and 20 days for high alcoholic drinks, thereby obtaining products having taste, colour and aroma features practically equivalent to the corresponding products aged or matured following a traditional route. From these tests it came out that whisky for example, submitted to a magnetic field in accordance with the invention at an average intensity of 100 Gauss, undergoes a maturation action within about 18 days.

All products treated in accordance with the invention have also shown an excellent stability, i.e. they have maintained the organoleptic features acquired with the treatment, also over time.

What is claimed is:

1. An apparatus for accelerating aging of alcoholic liquids, such as wines, brandies, spirits and the like, in which the liquids prepared for aging are contained in vessels, in particular casks and bottles, comprising at least one air-core wound solenoid made of an electric conductive wire disposed close to at least one of said vessels, and at least one electric source to be connected with said at least one solenoid for generating a low-frequency polarized pulsating magnetic field at said at least one solenoid.

2. The apparatus as claimed in claim 1, wherein said vessels consist of bottles and the apparatus is comprised of a plurality of said solenoids and a support structure adapted to support each of said solenoids coaxially about a respective one of said bottles.

3. The apparatus as claimed in claim 1, wherein said vessels consist of bottles disposed substantially horizontally in side by side relationship and superposed, the apparatus further comprising a support structure for said at least one solenoid, said support structure comprising at least one panel-shaped container holding said at least one solenoid and disposed substantially vertically close to a plurality of said bottles arranged side by side and superposed.

4. The apparatus as claimed in claim 1, wherein said vessels consist of bottles disposed substantially horizontally side by side and superposed in at least two rows, the apparatus further comprising a support structure for said at least one solenoid, said support structure comprising at least one panel-shaped container holding said at least one solenoid and disposed substantially vertically between said at least two rows.

5. The apparatus as claimed in claim 3, comprising a plurality of said solenoids, a plurality of said panel-shaped containers and a plurality of said electric sources for generating low-frequency polarized pulsating magnetic fields, each of said electric sources being selectively connected with at least one of said solenoids of at least one of said panel-shaped containers.

6. The apparatus as claimed in claim 1, wherein said vessels consist of casks and the apparatus comprises a plurality of solenoids, each of said solenoids being coaxially associated with one of said casks.

7. The apparatus as claimed in claim 1, wherein said vessels consist of casks and wherein said at least one solenoid is disposed within at least one panel-shaped container arranged alongside at least one of said casks.

8. The apparatus as claimed in claim 7, wherein said at least one panel-shaped container is disposed between two of said casks.

9. The apparatus as claimed in claim 7, comprising a plurality of said solenoids, a plurality of said panel-shaped containers and a plurality of electric sources for generating low-frequency polarized pulsating magnetic fields, each of said electric sources being selectively connected with at least one of said solenoids of at least one of said panel-shaped containers.

10. The apparatus as claimed in claim 1, wherein said vessels are substantially in the form of a parallelepiped of several sides, and wherein said at least one solenoid is disposed within at least one panel-shaped container arranged close to at least one of said sides.

11. The apparatus as claimed in claim 1, comprising at least one panel-shaped container for housing said at least one solenoid, said at least one solenoid being disposed in an interchangeable manner within said at least one panel-shaped container.

12. The apparatus as claimed in claim 1, wherein said at least one solenoid is disposed within at least one panel-shaped container, the apparatus further comprising a support structure for said at least one panel-shaped container, said at least one panel-shaped container being supported in an interchangeable manner by said support structure.

* * * * *